United States Patent
Greaves

(10) Patent No.: US 10,564,066 B2
(45) Date of Patent: Feb. 18, 2020

(54) FATIGUE TESTING

(71) Applicant: Ore Catapult Development Services Limited, Blyth, Northumberland (GB)

(72) Inventor: Peter Greaves, Newcastle upon Tyne (GB)

(73) Assignee: ORE CATAPULT DEVELOPMENT SERVICES LIMITED, Blyth, Northumberland (GB)

( * ) Notice: Subject to any disclaimer, the term of this patent is extended or adjusted under 35 U.S.C. 154(b) by 172 days.

(21) Appl. No.: 15/538,089

(22) PCT Filed: Dec. 23, 2015

(86) PCT No.: PCT/GB2015/054145
§ 371 (c)(1),
(2) Date: Jun. 20, 2017

(87) PCT Pub. No.: WO2016/102968
PCT Pub. Date: Jun. 30, 2016

(65) Prior Publication Data
US 2017/0350785 A1    Dec. 7, 2017

(30) Foreign Application Priority Data
Dec. 23, 2014  (GB) .................................. 1423028.8

(51) Int. Cl.
| G01M 5/00 | (2006.01) |
| G01M 7/02 | (2006.01) |
| G01M 15/14 | (2006.01) |

(52) U.S. Cl.
CPC ........ G01M 5/0033 (2013.01); G01M 5/0025 (2013.01); G01M 5/0066 (2013.01);
(Continued)

(58) Field of Classification Search
CPC ............. G01M 5/0035; G01M 5/0025; G01M 5/0066; G01M 5/0075
(Continued)

(56) References Cited

U.S. PATENT DOCUMENTS

| 6,341,258 B1 | 1/2002 | Inoue et al. |
| 6,375,672 B1 * | 4/2002 | Aksan .................... A61B 18/20 606/9 |

(Continued)

FOREIGN PATENT DOCUMENTS

| CN | 102607831 | 7/2012 |
| CN | 103645065 | 3/2014 |

(Continued)

OTHER PUBLICATIONS

International Search Report dated Mar. 23, 2016 issued in PCT International Patent Application No. PCT/GB2015/054145, 6 pp.
(Continued)

Primary Examiner — Tarun Sinha
(74) Attorney, Agent, or Firm — Nixon & Vanderhye P.C.

(57) ABSTRACT

The present invention relates to a method of fatigue testing an elongate specimen, such as a wind turbine blade, comprising: calculating a service life damage sum at one or more locations on at least one respective first section of an elongate specimen, responsive to at least one strain time history associated with the specimen; determining a predicted test damage sum at the one or more locations for each of a plurality of predetermined test blocks separately applicable to the specimen; and selecting at least one test block associated with the plurality of predetermined test blocks based on a comparison of the predicted test damage sum with the service life damage sum for each of the one or more locations, wherein the selected at least one test block is applicable to the specimen to cause a test damage sum at
(Continued)

each of the one or more locations that at least substantially matches the service life damage sum at each of the one or more locations.

19 Claims, 8 Drawing Sheets

(52) U.S. Cl.
CPC .......... *G01M 5/0075* (2013.01); *G01M 7/022* (2013.01); *G01M 15/14* (2013.01)

(58) Field of Classification Search
USPC .......................................................... 73/577
See application file for complete search history.

(56) References Cited

U.S. PATENT DOCUMENTS

| | | | |
|---|---|---|---|
| 2002/0013643 | A1 | 1/2002 | Ishii et al. |
| 2006/0037402 | A1 | 2/2006 | Musial et al. |
| 2006/0069521 | A1 | 3/2006 | Meyer et al. |
| 2009/0306909 | A1 | 12/2009 | Mattes |
| 2010/0263448 | A1* | 10/2010 | Hughes .................. F03D 1/065 73/577 |
| 2014/0100832 | A1* | 4/2014 | Pado .................. G01M 5/0033 703/6 |

FOREIGN PATENT DOCUMENTS

| | | |
|---|---|---|
| DE | 20 2011 001 901 U1 | 4/2011 |
| EP | 2 720 024 | 4/2014 |
| EP | 2 803 968 | 11/2014 |
| GB | 2491045 | 11/2012 |
| JP | 9-250990 | 9/1997 |
| KR | 10-2013-0118065 | 10/2013 |
| WO | WO 2004/005879 | 1/2004 |
| WO | WO 2008/145727 | 12/2008 |
| WO | WO 2009/097049 | 8/2009 |
| WO | WO 2009/127851 | 10/2009 |

OTHER PUBLICATIONS

Great Britain Search Report and Examination Opinion dated Apr. 13, 2015 issued in Great Britain Patent Application No. 1423028.8, 7 pp.
Beckwith, Jenna Austin, "Proof of Concept Test for Dual-Axis Resonant Phase-Locked Excitation (PhLEX) Fatigue Testing Method for Wind Turbine Blades," Embry-Riddle Aeronautical University Scholarly Commons Dissertations and Theses, Dec. 3, 2014, 118 pp.
Greaves, Peter Robert, "Fatigue Analysis and Testing of Wind Turbines Blades,"Durham E-Theses, Published 2013, Available at Durham E-Theses Online: http://etheses.dur.ac.uk/7303/, 289 pp.
Greaves, Peter Robert et al., "Evaluation of Dual-Axis Fatigue Testing of Large Turbine Blades," Institution of Mechanical Engineers Part C Journal of Mechanical Engineering Science 1989-1996 (vol. 203-210), Jul. 2012, pp. 1693-1704.
IEC 61400-23 Wind Turgbines—Part 23: Full-Scale Structural Testing of Rotor Blades, International Standard, Edition 1.0, published Apr. 2014, 48 pp.
Hughes, S.D. et al., "Implementation of a Two-Axis Servo-Hydraulic System for Full-Scale Fatigue Testing of Wind Turbine Blades," National Renewable Energy Laboratory (NREL), Presented at Windpower '99, Burlington, Vermont, Jun. 20-23, 1999, 11 pp.
Nielsen, Per Hørlyk et al., "Rotor Blade Full-Scale Fatigue Testing Technology and Research," DTU Wind Energy, DTU Wind Energy E, No. 0041, Dec. 2013, 29 pp.
Nijssen, R.P.L., "Fatigue Life Prediction and Strength Degradation of Wind Turbine Rotor Blade Composites," Nov. 2006, 267 pp.
Notice of Opposition dated Oct. 23, 2019 filed against European Patent No. 3237873 by LM Wind Power A/S, 27 pp.
Notice of Opposition dated Oct. 23, 2019 filed against European Patent No. 3237873 by Danmarks Tekniske Universitet, 27 pp.
Standard DNV-DS-J102, Design and Manufacture of Wind Turbine Blades, Offshore and Onshore Wind Turbines, Oct. 2010, 71 pp.
Vertua, Andrea et al., "Proving Ground Optimisation Based on Fatigue Damage Spectra", Affidabilità e Technologie 2011, SF2M, Journées de Printemps 2011, 13 pp.
WidipediA, Least Squares, Nov. 2014 1 page.

* cited by examiner

| Pitch Angle | Flap Amplitude (% Target) | Edge Amplitude (% Target) | Number of Repeats |
|---|---|---|---|
| 36 | 20 | 0 | 851155 |
| 36 | 30 | 0 | 200708 |
| 36 | 40 | 0 | 11088 |
| 36 | 30 | 20 | 220466 |
| 72 | 20 | 30 | 43427 |

FATIGUE TESTING

This application is the U.S. national phase of International Application No. PCT/GB2015/054145 filed Dec. 23, 2015 which designated the U.S. and claims priority to Great Britain Patent Application No. 1423028.8 filed Dec. 23, 2014, the entire contents of each of which are hereby incorporated by reference.

FIELD OF THE INVENTION

The present invention relates to testing of elongate specimens, such as wind turbine blades or the like. In particular, but not exclusively, the present invention relates to dual axis fatigue testing of elongate specimens, such as wind turbine blades.

There is currently a trend within the wind turbine industry towards larger wind turbines to reduce the impact of the cost of installation, maintenance and grid connection of a wind turbine on the overall cost of the energy converted by the wind turbine. For this reason, longer and larger blades are being designed and produced to capture an increased amount of energy from the wind, with some blades being over 75 m long. The increase in size results in an increase in the loads that the blade is subjected to in use. The blades are some of the most critical components of the turbine so full-scale tests on all new designs of blade are performed before they are released onto the market to ensure that they do not fail whilst in service.

There are two main types of testing a wind turbine blade; static testing and dynamic fatigue testing. Static tests demonstrate that the blade can survive the extreme loads that the blade will see in service and fatigue tests demonstrate that the blade can survive the design lifetime of the turbine.

Conventionally, winches or linear actuators are attached to the blade to apply forces to the blade in typically four different directions whilst strain is measured at defined points on the blade surface. Typically, a blade is horizontally orientated and constrained in all directions at its root by bolting the root to a suitable fixed test bed. Loads are then applied to the blade at desired locations and directions along the blade. One type of load which is applied perpendicularly to the longitudinal axis of the blade and substantially perpendicularly to the chord of the aerofoil is known as a flapwise load. Another type of load which is also applied perpendicularly to the longitudinal axis of the blade and substantially parallel to the chord of the aerofoil is known as an edgewise load. These tests may be either static or dynamic for determining the stiffness and strength of a blade or its fatigue performance respectively.

Another known type of test is to cantilever the blade at its root from a fixed test bed and cause the blade to resonate at a mode of natural frequency. To cause the blade to resonate, it is known to apply a sinusoidal load in the flapwise or edgewise direction to excite the blade at one or more locations, which are chosen so that the resulting mode shape results in a close match to the desired loads along the blade length. These loads are calculated so that an equivalent amount of damage to that which is predicted to occur during the service life (typically around 20 years) of the blade occurs after a given number of cycles, typically of the order of 1 million cycles.

The resonant vibration of the blade reduces the amount of energy otherwise required to apply for example bending or lateral loads to the blades. Therefore, resonant excitation is a desirable method of performing a fatigue test on a wind turbine blade. However, the test is generally limited to the first natural frequency of the blade with all the test equipment mounted on it. Furthermore, as blades increase in length and mass, the forces, deflections and aerodynamic damping which occur during a cyclic fatigue test all increase and also the resonant frequency of the blade decreases resulting in the tests taking longer to perform and the costs associated therewith increasing.

In addition, wind turbine blades are conventionally fatigue tested in both the flapwise and edgewise directions and these tests are performed separately, with typically around 1 million cycles to 5 million cycles for each direction. However, in service, the two loads occur together so this test method does not represent real-life service conditions and requires a significant amount of time and cost. For particularly large blades, the test program can take longer than a year, so a test method which reduces the test time is desirable.

A conventional dual axis test method is forced displacement testing in which the blade is loaded in the flapwise and edgewise directions by linear actuators attached to fixed structures. The loads can be applied with the correct phase angle between them which solves the problem of over-testing but, because they are applied at a frequency substantially different to the natural frequency of the blade, the loading is effectively quasi-static. This means that the portion of the blade beyond the cylinder attachment point is unloaded and the bending moment distribution between the root and the cylinder is linear. In practice this means that the target loads can only be achieved over a small portion of the blade span. In addition to these problems, the high loads and displacements that are required mean that a great deal of energy is used and initial capital costs are also very high. For these reasons, forced displacement testing becomes less attractive as blades increase in size.

A hybrid excitation system (as disclosed in US2006/0037402) applies flap loads to a blade using resonant excitation and edgewise loads are applied to the blade using forced displacement. The bending moment distribution in the flapwise direction can be tuned by altering the mode shape of the blade with additional static mass so the blade is tested with the correct loads over a far greater part of its span. However, the edgewise loading still has the same problems described above and the method is not feasible for large blades. For example, both the transverse actuator and resonant actuator are large and cumbersome and the resonant actuator includes a large reciprocating mass to cause the blade to vibrate which would not be suitable for large blades in view of the mass required. Furthermore, if the centre of gravity of the resonant actuator is offset from the axis of the blade, an unrealistic moment is imposed on the blade, particularly when moved by the transverse actuator.

Another conventional test method involves adding additional mass to the edgewise direction which is isolated from the flapwise direction through the use of a push rod with ball joints at each end. This reduces the edgewise frequency to the same level as the flapwise frequency so that the two loads can be applied at the same frequency with the correct phase angle between them. However, a problem associated with this method is that it takes a significant amount of time to set up because the frame which supports the additional mass is a large structure which needs to be moved and fixed in an optimal position along the length of the blade.

Furthermore, the size of the masses required to be attached to a relatively large blade means that the method is not particularly scaleable and is impractical for testing large blades.

SUMMARY OF THE INVENTION

It is an aim of the present invention to at least partly mitigate the above-mentioned problems.

It is an aim of certain embodiments of the present invention to provide a method of testing elongate specimens, such as wind turbine blades, which is capable of simultaneously applying edgewise and flapwise fatigue loading to the specimen in a controlled and practical manner in order to simulate real-life service conditions.

It is an aim of certain embodiments of the present invention to provide a method of testing elongate specimens, such as wind turbine blades, which determines optimal dual axis test conditions from the amount of damage that will accumulate at one or more locations on a test specimen under different dual axis test conditions.

It is an aim of certain embodiments of the present invention to provide a method of testing elongate specimens, such as wind turbine blades, which determines the amount of damage accumulating at one or more locations on a test specimen during the test and 'on the fly' to allow adjustments to the test set-up and load levels to be made which modify how damage accumulates around the specimen.

It is an aim of certain embodiments of the present invention to provide a method of testing elongate specimens, such as wind turbine blades, which allows a closer match to the service life damage whilst still retaining the benefits of resonant testing.

According to a first aspect of the present invention there is provided a method of fatigue testing an elongate specimen, comprising:
  calculating a service life damage sum at one or more locations on at least one respective first section of an elongate specimen, responsive to at least one strain time history associated with the specimen;
  determining a predicted test damage sum at the one or more locations for each of a plurality of predetermined test blocks separately applicable to the specimen; and
  selecting at least one test block associated with the plurality of predetermined test blocks based on a comparison of the predicted test damage sum with the service life damage sum for each of the one or more locations, wherein the selected at least one test block is applicable to the specimen to cause a test damage sum at each of the one or more locations that at least substantially matches the service life damage sum at each of the one or more locations.

Aptly, the method further comprises:
calculating a service life damage sum at each of a plurality of spaced apart locations on the at least one respective first section of the elongate specimen.

Aptly, each of the plurality of predetermined test blocks is defined by at least a first cyclic load having a first cyclic load amplitude and a first test duration for applying said first cyclic load to the specimen.

Aptly, the first cyclic load is applicable to the specimen in a substantially perpendicular direction with respect to a longitudinal axis of the specimen.

Aptly, each of the plurality of predetermined test blocks is further defined by a further cyclic load having a further cyclic load amplitude and a further test duration for applying said further cyclic load to the specimen.

Aptly, the further cyclic load is applicable to the specimen in a substantially perpendicular direction with respect to a longitudinal axis of the specimen.

Aptly, the first cyclic load is substantially perpendicular to the further cyclic load.

Aptly, the first test duration is substantially equal to the further test duration.

Aptly, each of the plurality of predetermined test blocks is further defined by a pitch angle of the specimen with respect to a longitudinal axis of the specimen.

Aptly, the method further comprises:
determining the predicted damage sum at each of the one or more locations for the plurality of predetermined test blocks, wherein each predetermined test block is defined by a respective test duration, a pitch angle of the specimen with respect to a longitudinal axis of the specimen, a flapwise load amplitude and an edgewise load amplitude.

Aptly, the specimen comprises a cantilevered elongate specimen constrained at a fixed end in all degrees of freedom.

Aptly, the specimen comprises an aerofoil cross section having a chord axis and the first cyclic load is a flapwise cyclic load applicable substantially perpendicularly to the chord axis and the further cyclic load is an edgewise cyclic load applicable substantially parallel to the chord axis.

Aptly, the first and further cyclic loads respectively comprise a first and further bending moment each having a respective bending moment amplitude.

Aptly, the specimen comprises a wind turbine blade constrained at a root end of the blade.

Aptly, the at least one test block is selected from the plurality of predetermined test blocks.

Aptly, the method further comprises:
determining a combination of a plurality of said test blocks associated with the plurality of predetermined test blocks, wherein said combination causes a test damage sum at each of the one or more locations that at least substantially matches the service life damage sum at each of the one or more locations when said test blocks are applied to the specimen.

Aptly, the method further comprises:
determining the combination of said test blocks to be applied to the specimen responsive to applying a constrained least-squares based optimisation routine to compare the predicted damage sum with the service life damage sum for the one or more locations.

Aptly, the method further comprises:
physically applying the at least one test block to the specimen.

Aptly, the method further comprises:
determining a test damage sum at the one or more locations whilst the at least one test block is being applied to the test specimen.

Aptly, the method further comprises:
generating the at least one strain time history for the one or more locations on the at least one first section of the specimen based on at least one load time history associated with the first section of the specimen and at least one cyclic test block associated with the specimen.

Aptly, the method further comprises:
calculating the service life damage sum at the one or more locations responsive to performing fatigue analysis of the at least one strain time history using a linear damage algorithm.

Aptly, the method further comprises:
reducing a variable amplitude of the at least one strain time history to a constant amplitude responsive to applying a cycle counting algorithm to the at least one strain time history.

Aptly, the at least one section of the specimen comprises a plurality of spaced apart sections located along a length of the elongate specimen and perpendicularly oriented with respect to a longitudinal axis of the specimen, each section having respective one or more locations.

Aptly, the one or more locations are arranged on an outer surface of the specimen.

According to a second aspect of the present invention there is provided a system for fatigue testing an elongate specimen, comprising:
  a controller for performing the method according to the first aspect of the present invention; and
  apparatus operatively associated with the controller for applying the selected at least one test block to an elongate specimen.

Aptly, the at least one test block comprises a first cyclic load applied in a first direction to the elongate specimen and a further cyclic load applied in a further direction to the elongate specimen.

Aptly, the first and further directions are substantially perpendicular with respect to each other.

Aptly, the first and further directions are each substantially perpendicular with respect to a longitudinal axis of the specimen.

Aptly, the system comprises at least one sensor operatively associated with the specimen and the controller. Aptly, the at least one sensor comprises one or more of a stress and/or strain gauge, accelerometer, displacement sensor, laser and camera.

Aptly, the controller comprises a computing device including one or more processors.

According to a third aspect of the present invention there is provided a computer program comprising instructions which when implemented on a computer controls the computer to perform a method according to the first aspect of the present invention.

According to a fourth aspect of the present invention there is provided a computer program product on which is stored a computer program according to the third aspect of the present invention.

According to a fifth aspect of the present invention there is provided a method of fatigue testing an elongate specimen, comprising:
  calculating a service life damage sum for at least one location on an elongate specimen responsive to a strain time history associated with said location;
  determining a predicted damage sum at said location responsive to each of a plurality of test blocks applicable to the specimen; and
  selecting a test block of said plurality of test blocks to apply to a test specimen to cause a test damage sum at said location that substantially matches the determined service life damage for said location.

According to a sixth aspect of the present invention there is provided a method of fatigue testing an elongate specimen, comprising:
  calculating a service life damage sum for at least one location on an elongate specimen responsive to a strain time history associated with said location in a service is life condition;
  determining a predicted test damage sum for the at least one location responsive to each of a plurality of predetermined test blocks applicable to the specimen in a test condition; and
  selecting at least one of said predetermined test blocks to apply to a physical test specimen to cause an actual test damage sum at said location on the test specimen that substantially matches the calculated service life damage sum for said location.

According to a seventh aspect of the present invention there is provided a method of fatigue testing a physical elongate test specimen, comprising:
  calculating a service life damage sum for at least one location on an elongate specimen based on a strain time history associated with the specimen in a service life condition;
  determining a predicted test damage sum for the at least one location based on each of a plurality of predetermined test blocks applicable to the specimen in a test condition;
  comparing the predicted test damage sum with the service life damage sum for the at least one location;
  selecting at least one of the predetermined test blocks to physically apply to the specimen to cause an actual test damage sum at said location on the test specimen that substantially matches the calculated service life damage sum for said location; and
  applying the selected at least one predetermined test block to the specimen; wherein each predetermined test block comprises a test duration, a pitch angle of the specimen, a flapwise load level and an edgewise load level.

According to an eighth aspect of the present invention there is provided a method of fatigue testing an elongate test specimen, comprising:
  determining service life damage sum at each of a plurality of points located on a surface of the elongate test specimen and on a cross section of the specimen;
  applying different combinations of a plurality of predetermined load blocks to an elongate specimen constrained at a first end to excite a further end of the specimen, wherein each predetermined load block comprises a pitch angle of the specimen, a first cyclic load, and a further cyclic load applied substantially perpendicular to the first cyclic load;
  determining a test damage sum for each of the plurality of points;
  comparing the test damage sum with the service life damage sum for each point to determine an optimal combination of said load blocks to cause a test damage sum which at least closely matches the service life damage sum for each point; and
  physically applying the optimal combination of said load blocks to the test specimen.

Certain embodiments of the present invention may provide an optimised fatigue test method for testing elongate specimens, such as wind turbine blades, which is capable of simultaneously applying edgewise and flapwise fatigue loading to the specimen in a controlled and practical manner in order to simulate real-life service conditions.

Certain embodiments of the present invention may provide an optimised fatigue test method for testing elongate specimens, such as wind turbine blades, which determines optimal dual axis test conditions to apply to an elongate test specimen such that the damage accumulating at one or more locations on the test specimen during the test substantially matches the predicted service life damage at the one or more locations.

Certain embodiments of the present invention may provide an optimised fatigue test method for testing elongate specimens, such as wind turbine blades, which determines the amount of damage accumulating at one or more locations on a test specimen during the test and 'on the fly' to allow adjustments to the test set-up and load levels to be made which modify how damage accumulates around the specimen and in turn ensures that the test is progressing correctly.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
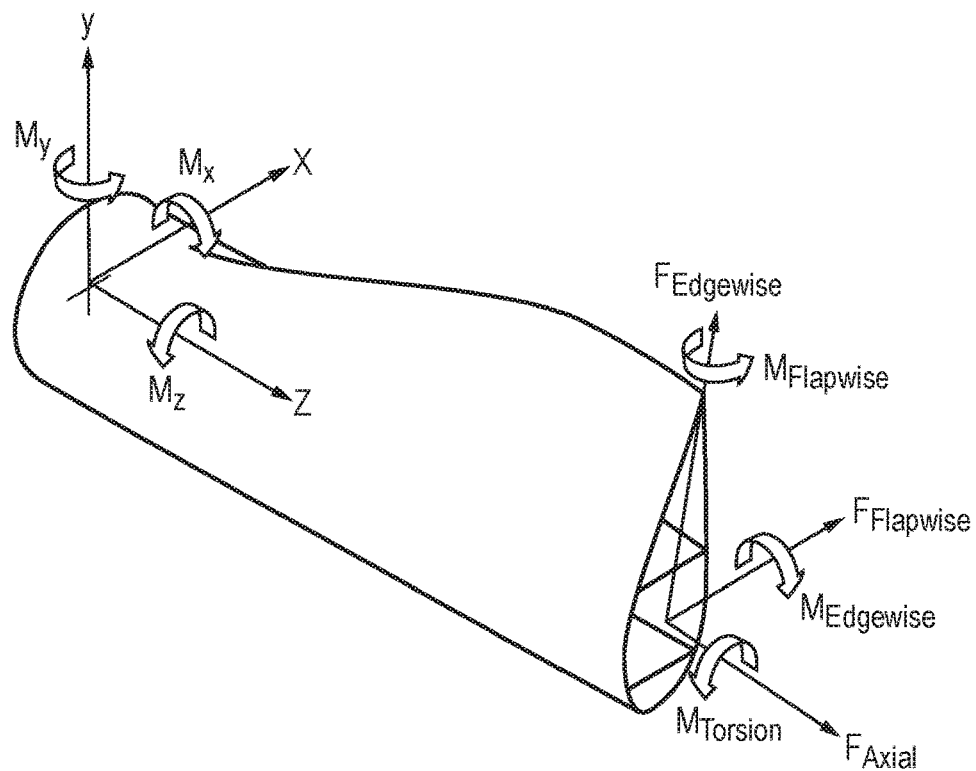
FIG. 1 illustrates the different loads acting on a wind turbine blade.

In the drawings like reference numerals refer to like parts.

In accordance with certain embodiments of the present invention, multiple load cases for fatigue testing wind turbine blades are analysed and described herein. These load cases are referred to herein as 'test blocks' (or 'load blocks') for the purposes of describing certain embodiments of the present invention. However, it will be understood that other types of elongate specimen, such as an aeroplane wing, helicopter rotor blade, tidal turbine blade, or the like, may be tested in accordance with certain embodiments of the present invention and the present invention is not limited to testing wind turbine blades.

The most important load cases are generally dependent on individual designs of blades but, for a fatigue analysis of a wind turbine blade, the load cases typically include the following: parked in turbulent wind above and below the cut-in and cut-out wind speeds (in steps of up to about around 2 m/s), operational in turbulent wind (in steps of up to about around 2 m/s) between the cut-in and cut-out wind speed, operational with faults, and normal start-ups and shut-downs at the cut-in/cut-out/rated wind speeds.

Under these operational scenarios, the main sources of blade loading are aerodynamic, gravitational, centrifugal, gyroscopic and operational. Aerodynamic loading is unavoidable and is vital to the function of the wind turbine. As turbines increase in size, the mass of the blade generally increases proportionately at a cubic rate. The gravitational and centrifugal forces become critical due to the increased blade mass. Gyroscopic loads result from yawing of the turbine during operation.

Aerodynamic loads are generated by lift and drag of the blade aerofoil section which is dependent on wind velocity, blade velocity, the aerodynamic profile, and the angle of attack. The angle of attack is dependent on blade twist and pitch. The aerodynamic lift and drag produced are resolved into thrust in the direction of the hub axis and torque about this axis which is absorbed by the generator and reaction forces. The reaction forces are substantial acting in the flapwise bending plane and must be tolerated by the blade with limited deformation. Aerodynamic forces are calculated using conventional blade element momentum (BEM) theory, as will be understood in the art.

Gravitational and centrifugal forces are mass dependent which generally increase cubically with increasing turbine diameter. Therefore, inertial loads are critical for turbines having a diameter of about around 70 metres or more. The centrifugal force is a product of rotational velocity squared and mass and acts radially outward, hence the increased load demands of higher blade tip speeds. Centrifugal and gravitational loads are superimposed to give a positively displaced alternating condition with a frequency dictated by the angular velocity of the rotor blade revolution.

A turbine blade can be divided into three main areas classified by aerodynamic and structural function. The 'blade root' is the transition between the circular mount and the first aerofoil profile and carries the highest loads. The design of the 'mid span' of the blade balances aerodynamic and structural considerations and the 'tip' of the blade is aerodynamically critical and where the lift to drag ratio will be maximised.

The different loads acting on the root of a wind turbine blade and on a section along the mid span of the blade are illustrated in FIG. 1.

The flapwise bending moment acting on the blade is substantially a result of the aerodynamic loads.

The edgewise bending moment is substantially a result of blade mass and gravity. Simple scaling laws dictate a cubic rise in blade mass with increasing turbine size, such that for turbine sizes in excess of 70 metres, this load case is said to be increasingly critical. The edgewise bending moment is at its maximum when the blade reaches the horizontal position.

The loads acting on a given blade cross section (flapwise and edgewise bending moments, axial force, flapwise and edgewise shear forces and torsional moment about the longitudinal axis) are calculated using wind turbine simulation software such as Bladed, HAWC2 or FAST, or the like.

This simulation software will typically comprise a structural model of the entire turbine, and will account for aerodynamic loads, hydrodynamic loads (for offshore wind turbines), inertial loading, loading from control devices such as blade pitch or nacelle yaw actuators, and electrical loading caused by the behaviour of the grid.

The flapwise and edgewise bending moments have the greatest influence on axial strain of the blade in use. These loads have a cyclic component arising from the fact that wind speed tends to increase with height and air tends to stagnate in front of the turbine tower. Superimposed on this periodic loading is random loading caused by turbulence. Thus, the major loading conditions applied to the blade are not static but indeed cyclic in the form of fatigue loading which can occur when a material is subjected to a repeated non-continuous load which causes the fatigue life of the material to be exceeded. Fatigue loading is a result of the gravitational cyclic loads which are equal to the number of rotations of the rotor throughout the lifetime of the turbine, typically about around 20 years. In addition, relatively small stochastic loads are created by gusting wind contributing up to about around $1\times10^9$ cyclic loadings during the turbine lifetime.

According to certain embodiments of the present invention, load-time histories are generated for a range of different cross sections along the length of the blade for all load cases specified in the design standards (see step S140 of FIG. 14) and which are representative of the service environment experienced by the blade. The design standards vary by country but the DNV-GL Guideline for the Certification of Wind Turbines and IEC 61400-1 Wind turbines—Part 1: Design requirements are optionally used. A fatigue load case may comprise 10 minutes of normal operation at a given mean wind speed (for example about around 10 m/s) using the normal turbulence model. Turbulence models account for the stochastic nature of wind speed in 3 dimensions, and they are specified in the design standards described above.

The frequency of occurrence of each operational and parked load case is calculated from the statistical distribution of the wind speed using a method described in the design standards. This method involves assuming that the statistical distribution of the 10 minute average wind speed can be described by a Weibull distribution with a shape factor of 2 (a special case, known as a Rayleigh distribution). The wind speed is then divided into bins from 0 m/s up to a maximum specified in the design guidelines, and the probability that the wind speed will lie in a given bin is calculated by integrating the Rayleigh distribution between the start and end of the bin.

The frequency of occurrence of start-up and shut-down and other load cases is often dictated by the control system behaviour, and is generally agreed with the certifying body on an ad-hoc basis.

Figure 2:
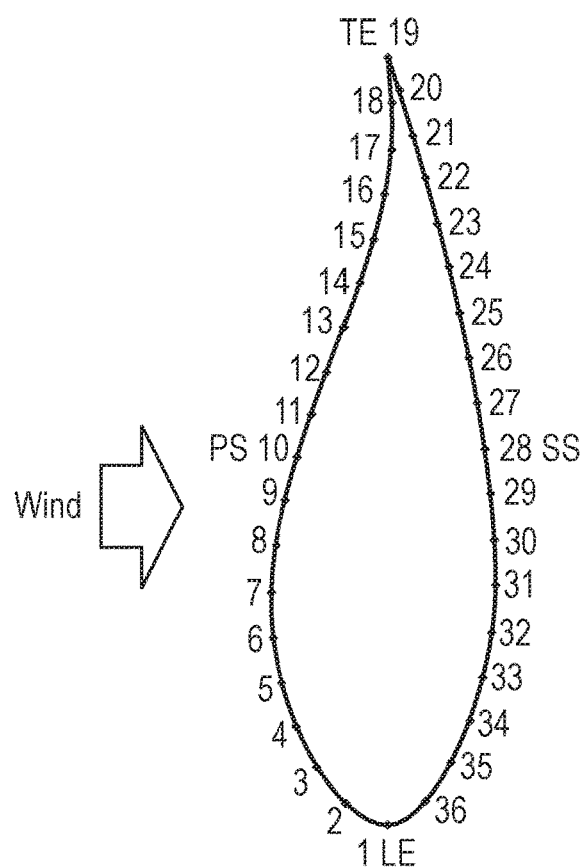
FIG. 2 illustrates an example of the cross section node numbering around a section of a blade according to certain embodiments of the present invention.
Figure 14:
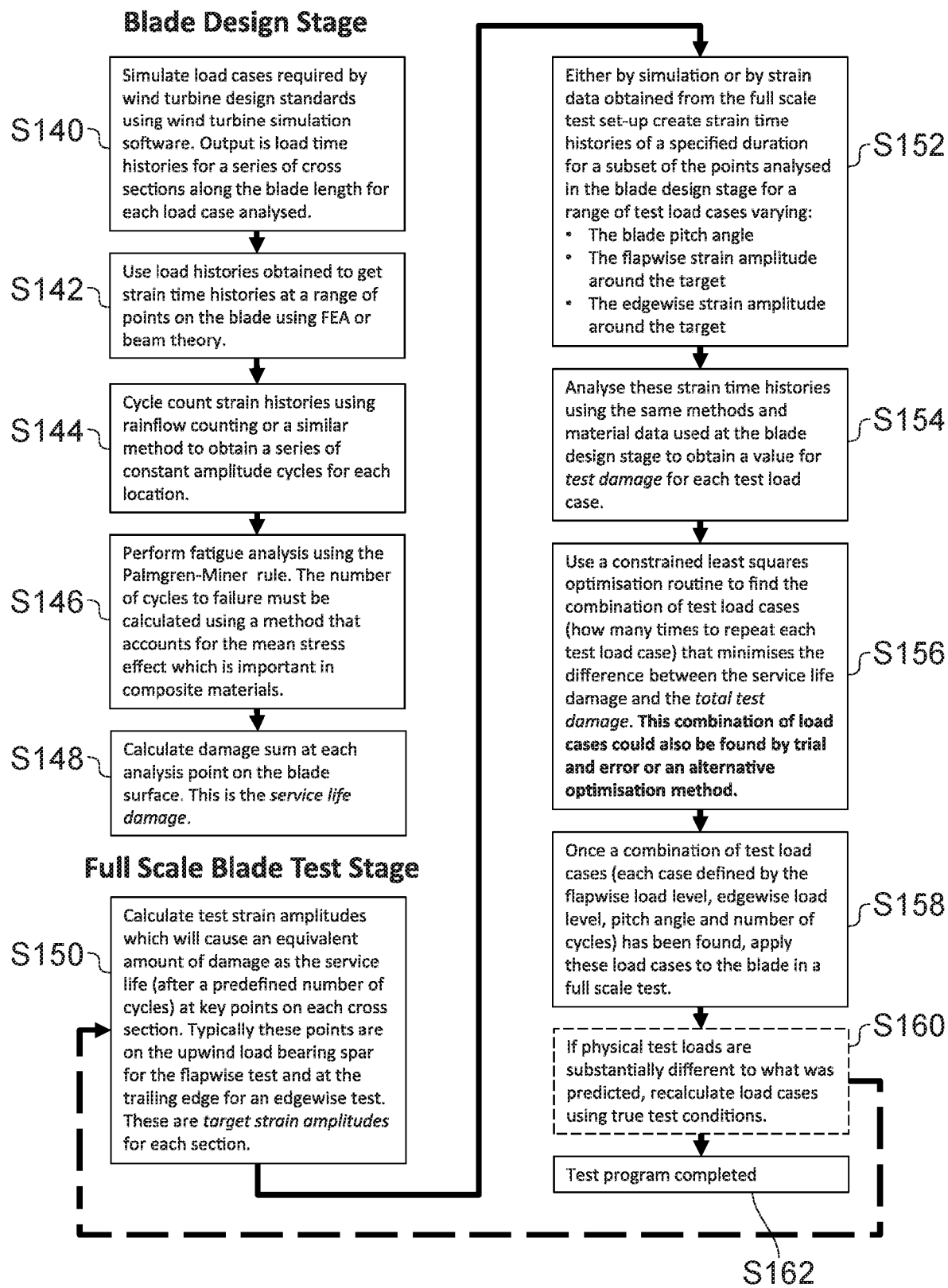
FIG. 14 illustrates a flow chart of the optimised fatigue testing method according to certain embodiments of the present invention.

As shown at step S142 of FIG. 14, strain time histories are then generated from the load time histories at a range of spaced apart locations around the surface of the blade at each cross section, using for example beam theory or a finite element model of the blade, or the like. A 'strain time history' is a list of the value of strain (the ratio of total deformation to the initial dimension of the material body) at discrete points (referred to as 'locations' or 'nodes' herein) in time. The numbered locations around a mid-span blade section, for example, are illustrated in FIG. 2. Thirty six locations have been used in this embodiment by way of example only and it will be understood that any desired number of locations and cross sections can be envisaged.

As shown at step S144 of FIG. 14, the variable amplitude strain time history at each location around the blade section is reduced down to a series of constant amplitude cycles using a cycle counting method, such as rainflow counting.

As shown at step S146 of FIG. 14, fatigue analysis of the strain time histories at each location around the chosen section is then performed to calculate a predicted service life damage sum D for each location. The service life damage sum D caused by a load case time history is calculated using the Palmgren-Miner linear damage assumption according to equation (1) below. However, it will be understood that other suitable methods may be used to perform fatigue analysis of the strain time histories at each location for a respective blade section.

$$D = \sum_{i=1}^{k} \frac{n}{N_i} \quad (1)$$

In equation (1), n is the number of occurrences of the load case during the turbine life, k is the total number of cycles in the time history, $N_i$ is the number of repeats to failure for a cycle with the characteristics of cycle i and D is the damage sum, a number typically from 0 to about around 1 which represents the proportion of the life that has been used up.

Figure 3:
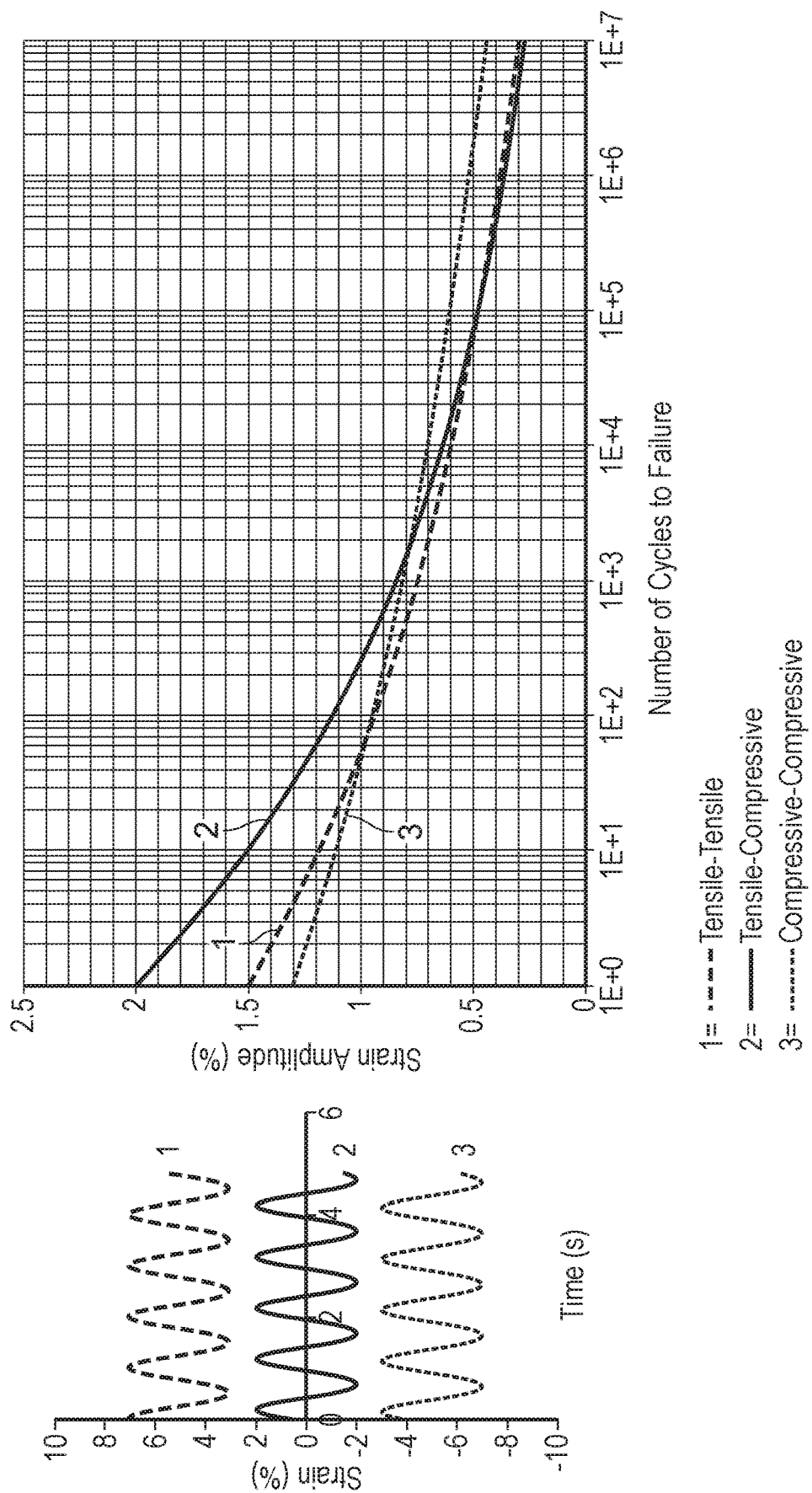
FIG. 3 illustrates the SN curves for a blade composite material.

The number of repeats to failure for a given cycle $N_i$ is calculated using an SN curve (sometimes called a Wöhler curve) for the material of the blade. Wind turbine blades are usually made from composite materials which have very different fatigue properties depending on whether they are undergoing compressive, tensile or reversing fatigue. Small scale coupon tests are performed to characterise the material under a range of conditions, and SN curves for cycles in between the conditions for which the material has been characterised are calculated by interpolation. Typical SN curves for a range of different loading conditions are illustrated in FIG. 3. The dual axis test method according to certain embodiments of the present invention exploits the fact that composite materials exhibit different fatigue behaviour depending on the mean strain level.

The service life damage is the damage sum resulting from the strain time history caused by the service life loads. It is this service life damage that physical specimen testing according to certain embodiments of the present invention seeks to replicate. The strain time history is calculated using the Palmgren-Miner linear damage assumption or similar. This process can be applied at more than one location on the blade (the loads and strains will of course be different at each location, and the material fatigue properties may also be different at each location).

Steps S140 to S148 as shown in FIG. 14 may be referred to as the blade design stage of the optimised test method according to certain embodiments of the present invention. Steps S150 to S162 as shown in FIG. 14 may be referred to as the full scale blade test stage in accordance with certain embodiments of the present invention. This stage includes the physical and technical application of test blocks on a physical blade to perform dual axis fatigue testing on the physical blade in an optimised manner according to certain embodiments of the present invention. Whilst a mathematical method is used to arrive at the best combination of test blocks, e.g. step S156, it is perfectly possible that trial and error or a different optimisation method could be used to find the best combination of test blocks to apply to the physical blade specimen.

After the service life damage calculations have been performed for each location around a respective blade section, target bending moment amplitudes in the flapwise and edgewise directions are calculated for that section using the same fatigue analysis method as described above (as shown at step S150 of FIG. 14). However, as the fatigue behaviour changes depending on the stress ratio, there is not a closed form solution for determining the strain amplitude that causes the same amount of damage as the service life at a specific location on a blade section, so this process is generally iterative (for example, a bisection search is a particularly robust method of determining the correct strain amplitude, as described below). The target bending moment amplitudes are calculated for each section so that the flapwise bending moment causes substantially the same amount of damage $D_{target}$ at key locations on the pressure side (PS as indicated in FIG. 2) of the blade after a predetermined number of cycles n, such as about around 5 million cycles, as the service life damage D previously calculated for those locations. For the edgewise direction, the trailing edge (TE as indicated in FIG. 2) is generally the most damaged part so the damage is substantially matched at key locations there for a predetermined number of cycles.

If the service life damage at the key locations takes the value D and n is the number of cycles in the test (typically 5 million), then using the Palmgren-Miner rule the number of cycles N that would fail the blade can be calculated using the following equation as resolved from equation (1) above:

$$N = \frac{n}{D} \tag{2}$$

The Goodman diagram is piecewise linear so the SN curve varies with the R-value of the cycle, as will be understood in the art. This means that there is no simple formula to calculate what bending moment amplitude will result in N cycles to failure. The target bending moment which results in the correct strain amplitude is determined numerically using a bisection search. This is performed as follows:

1. Lower and upper boundaries for the bending moment amplitude are chosen and the midpoint between the two boundaries is calculated;
2. Either the lower boundary and the midpoint or the midpoint and the upper boundary will bracket a value of the bending moment amplitude that will result in a correct value for N;
3. The boundaries are redefined as the midpoint and whichever of the two boundaries brackets the solution, and a new midpoint is calculated; and
4. Steps 2 to 3 are repeated until the difference between the two boundaries is within a predefined tolerance.

The bending moment amplitude which will result in a given strain amplitude is calculated using the following equation, where $\varepsilon_a$ is the strain amplitude, EI is the bending stiffness in the direction in question, and y is the distance to the neutral axis.

$$M_a = \frac{\varepsilon_a EI}{y} \tag{3}$$

As shown at step S152 of FIG. 14, either by simulation or using strain data obtained from a physical test specimen, strain time histories each corresponding to respective target strain amplitudes are created for at least the key locations around the chosen section of the blade, wherein each target strain amplitude is based on a predetermined test duration and a predetermined test block. The test block is predetermined because the flapwise and edgewise load levels and pitch angle are determined before testing begins as part of the process of specifying the test conditions. An optimisation method according to certain embodiments of the present invention (in step S156) is later used to determine how many times to repeat each of the predetermined test blocks in order to obtain a test damage at each location (node) on the respective cross section of the blade which substantially matches the predetermined service life damage at each respective location (node).

Figures 4, 5:
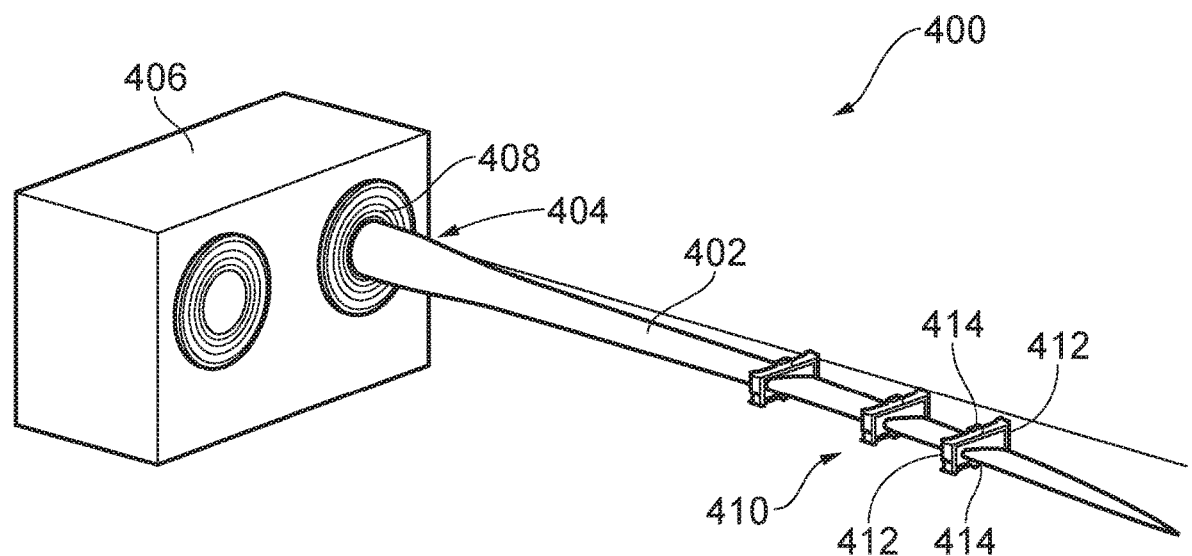
FIG. 4 illustrates apparatus for applying optimised dual axis cyclic loads, according to certain embodiments of the present invention to a wind turbine blade.
FIG. 5 illustrates an example of five test blocks selected for an optimised test of a wind turbine blade, according to certain embodiments of the present invention.

Aptly, corresponding strain time histories are created for a number of different predetermined test blocks, wherein each predetermined test block is defined by a blade pitch angle, a flapwise target bending moment amplitude and an edgewise target bending moment amplitude (see FIG. 5). For example, the blade may be pitched at a number of different angles, such as 10 equally spaced angles between 0 to 360 degrees about a longitudinal axis of the blade, which alters the mean strain around the blade cross section due to the self-weight of the blade, whilst the flapwise and edgewise target bending moments may each be chosen to increase from a value smaller than the target load to a value larger than the target load in for example 10 steps. This would mean 10×10×10=1000 analyses. These analyses are for a relatively short period (but long enough that the behaviour is representative of long term conditions but not so long that computation time is excessive). A simulation length of about around 100 seconds is sufficient to capture the behaviour. For the purposes of describing certain embodiments of the present invention, the test blocks are called 'predetermined' test blocks because the flapwise and edgewise load levels and pitch angle are determined before physical testing begins as part of the process of determining the optimal test conditions for a particular test specimen.

As described above, the strain time histories created at step S152 for at least the key locations around the chosen section of the blade may be determined by using strain data obtained from a physical test specimen. For example, a number of short representative physical tests may be carried out on the specimen using different combinations of flapwise and edgewise loading to obtain strain time histories for different loading combinations and pitch angles. This would involve mounting the blade on the test rig (as shown in FIG. 4) and placing strain gauges at points of interest on the blade, e.g. on a part of the blade most damaged by the service life, or near a structural detail. The strain time histories could then be recorded directly for set durations of loading under different levels of flapwise and edgewise loading and different pitch angles (this could be achieved by varying the amplitudes of the flapwise (412 in FIG. 4) and edgewise (414 in FIG. 4) exciters independently). These strain histories would then be analysed to calculate the damage sum using the same method applied for the service life. The best combination of test blocks to match the calculated service life damage at these points of interest could then be determined.

As shown at step S154 of FIG. 14, the strain time histories associated with the target strain amplitudes are analysed using the same methods and material data used above when calculating the service life damage at each location to obtain a predicted damage sum at each location for each predetermined test block.

As shown at step S156 of FIG. 14, a non-negative constrained least squares curve fitting method is then used to find which combination of the target strain amplitudes and thus predetermined test blocks causes a predicted damage sum at each location that best matches the service life damage distribution as determined previously for each location around a respective blade cross section. This combination of test blocks could also be found by trial and error or an alternative optimisation method.

The form of this optimisation problem is shown below by the following equation:

$$\begin{bmatrix} D_{S_1 L} \\ D_{S_2 L} \\ \vdots \\ D_{S_{n-1} L} \\ D_{S_n L} \end{bmatrix} = \tag{4}$$

-continued $$\begin{bmatrix} D_{S_1T_1} & D_{S_1T_2} & \cdots & D_{S_1T_{N-1}} & D_{S_1 1T_N} \\ D_{S_2T_1} & D_{S_2T_2} & \cdots & D_{S_2T_{N-1}} & D_{S_2 1T_N} \\ \vdots & \vdots & \ddots & \vdots & \vdots \\ D_{S_{n-1}T_1} & D_{S_{n-1}T_2} & \cdots & D_{S_{n-1}T_{N-1}} & D_{S_{n-1}1T_N} \\ D_{S_nT_1} & D_{S_nT_2} & \cdots & D_{S_nT_{N-1}} & D_{S_n 1T_N} \end{bmatrix} \begin{bmatrix} x_1 \\ x_2 \\ \vdots \\ x_{N-1} \\ x_N \end{bmatrix}$$

subject to $x \geq 0$

In the above equation (4), D refers to the damage sum and x is the number of test repeats. The subscript S refers to a strain gauge location (with n strain gauges), the subscript T refers to test block (with N test blocks) and the subscript L refers to the predicted service life. The equation is solved for x.

In other words, the optimised fatigue test method according to certain embodiments of the present invention determines the best combination of test blocks, i.e. predetermined test blocks, which are each defined by the flapwise and edgewise bending moments to be applied to a blade section, and a pitch angle of the blade, that replicates as closely as possible the damage that is caused to the blade by its service life. This optimum combination of test blocks could also be found using trial and error or an alternative optimisation methodology. In the trial and error approach, the person responsible for defining the combination of test blocks to be applied to the blade might prepare plots of the damage sum against position on the blade for each test block. These plots could then be compared to a plot of the service life damage sum against position on the blade by eye, and the test engineer could decide how many cycles of each test block to apply using their judgement.

As shown at step S158 of FIG. 14, the combination of test blocks determined by the optimised test procedure according to certain embodiments of the present invention is then applied to a physical blade test specimen. The test blocks are defined by pitch angle, flap amplitude and edge amplitude. It is current practice in the sector when testing blades to perform two test blocks separately (one with flapwise loads only and one with edgewise loads only), with no variation of the pitch angle during the test. If bi-axial testing is performed, then the loads and pitch angle are not varied and only one test block is performed. Applied on their own, the separate load blocks do not match well to the service life damage. However, by performing the loading with multiple test blocks with different levels of flapwise and edgewise loading and different pitch angles of the blade on the test stand (see FIGS. 6 and 7) in accordance with certain embodiments of the present invention, it is possible create a cumulative effect to at least closely match the damage caused by the test to the damage caused by the service life with a greatly improved level of accuracy as demonstrated in the FIGS. 8 to 13.

As shown at step S160 of FIG. 14, it is possible to recalculate test blocks (load cases) using true test conditions if physical test loads are substantially different to those predicted by earlier steps in the process. For example, if the strain time histories created at step S152 turn out to be incorrect, they may be updated part way through the physical test using true values obtained from the test.

As shown at step S162 of FIG. 14, the physical test programme is completed when all test blocks have been applied to the physical blade in a full scale physical test.

Apparatus for applying dual axis loading to a wind turbine blade is illustrated in FIG. 4. Such apparatus 400 is described in WO2009/127851. A test blade 402 is mounted at its root end 404 to a test bed 406 such that the blade extends substantially horizontally from the test bed in a cantilever arrangement. According to certain embodiments of the present invention, the blade 402 may be rotated at its root end about a longitudinal axis of the blade such that a pitch angle of the blade may be selectively adjusted responsive to the pitch angle of a test block to be applied to the blade. A flanged portion at the root of the blade 400 is bolted to a mounting hub 408 of the test bed 404 to constrain the root end of the blade in all directions during a test. The mounting hub 408 is selectively rotatable to adjust the pitch angle of the blade during test set-up or between tests. The mounting hub 408 is rotated by an electric motor, hydraulics, or the like, and may be remotely operated from a control room or automatically by a controller. During testing when a blade is subjected to dual axis cyclic loading, the mounting hub 408 is fixed and constrains the blade root in all six degrees of freedom. The controller also operates the loading apparatus 410 mounted at a location along the blade to apply optimised dual axis cyclic loading according to certain embodiments of the present invention to a selected cross section of the blade. The loading apparatus 410 (not shown in detail) comprises a mounting portion to mount the apparatus to a blade, and two pairs of spaced apart reciprocating masses to apply dual axis cyclic loading to the blade. One pair of spaced apart masses 412 is moved along a corresponding first linear displacement path in a direction which is perpendicular to the longitudinal axis of the blade and substantially perpendicular to the blade chord (the flapwise direction), whilst the other pair of spaced apart masses 414 is moved along a corresponding further linear displacement path that is substantially parallel to the blade chord direction and perpendicular to the longitudinal axis of the blade (the edgewise direction). Thus, an optimised dual axis test block comprising flapwise and edgewise cyclic loading is applied to a test blade that is orientated at a determined pitch angle for substantially causing a test damage sum at each location around a selected blade cross section that substantially matches the predicted service life damage at those locations.

As will be understood, the controller (not shown) may comprise a computing device including a processor or processors and memory and capable of performing the optimised test method as described above according to certain embodiments of the present invention. A control system including the controller may further comprise any one of a personal computer, smart phone, tablet computer, or the like, via which an instruction can be provided to remotely control the apparatus 400 in accordance with certain embodiments of the present invention. One or more gauges, sensors and/or accelerometers (not shown) may be mounted to the surface of the blade to measure/monitor a corresponding parameter, such as strain, stress, acceleration, displacement, or the like, at a corresponding location on the blade. One or more cameras and/or lasers may also be used as a datum tracking device to measure a displacement of the blade during testing and operatively associated with the controller. The control system may be an open loop system or closed loop system that is responsive to a feedback signal provided by a feedback sensor. Data may be exchanged between the loading apparatus 400, one or more gauges, sensors or the like, and the controller via a wireless or wired communication link, e.g. a fixed Ethernet connection. Thus, an optimised test block or a combination of test blocks can be applied to a blade to subject the blade to dual axis cyclic fatigue loading to substantially replicate real-life loading over a service life of the blade, whilst allowing for test parameters, such as damage, strain or the like, to be measured and monitored during a test such that other test parameters, such as load amplitude, blade pitch, frequency, or the like, can be selectively adjusted to cause a desired target damage to occur at one or more locations around a cross section of the blade that substantially closely matches a predicted service life damage at that location on the blade. In other words, certain embodiments of the present invention may provide an optimised method for fatigue testing wind turbine blades which determines the amount of damage accumulating at one or more locations on a test blade during the test and 'on the fly' to allow adjustments to the test set-up to be made which modify how damage accumulates around the specimen and in turn ensures that the test is progressing correctly.

In the following example, six blade cross sections have been analysed using the above steps and the determined optimised test blocks to substantially match the service life damage for the blade.

Figure 6:
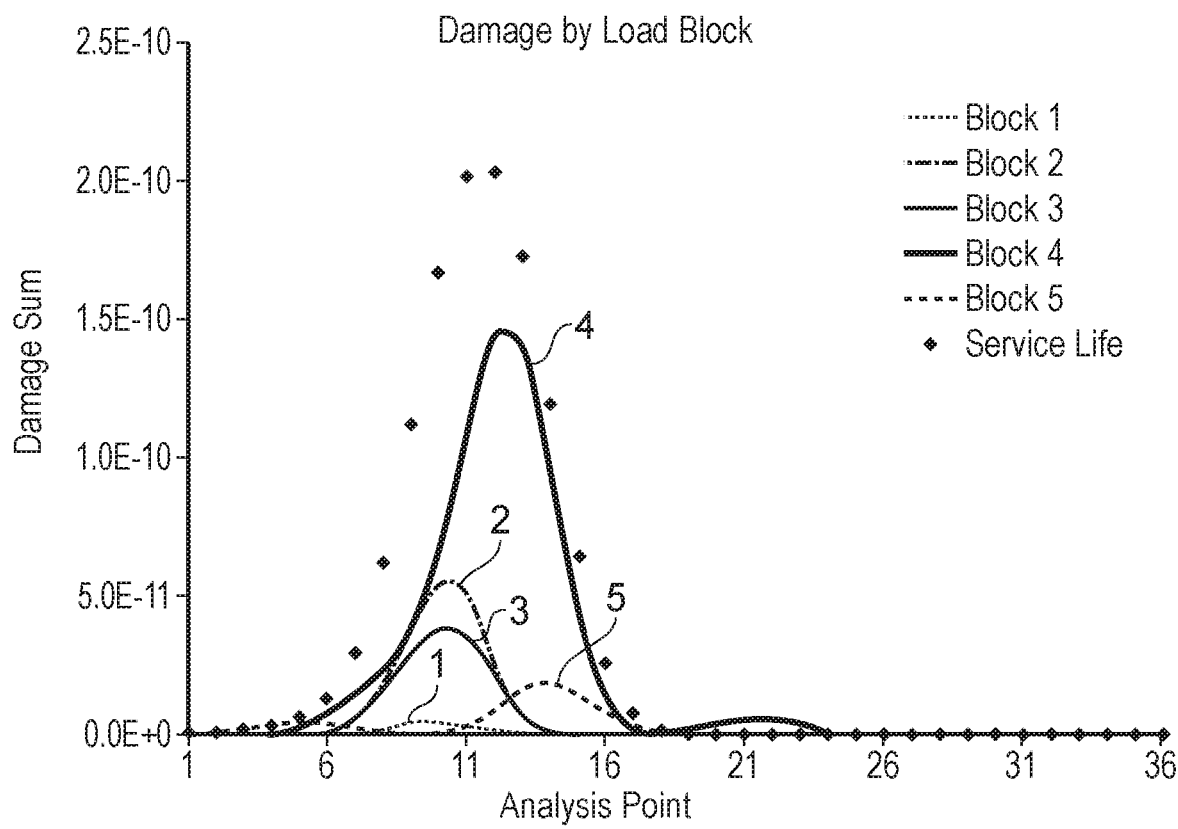
FIG. 6 illustrates the damage effect of the test blocks (load blocks) of FIG. 5 when applied individually to the blade root section.
Figure 7:
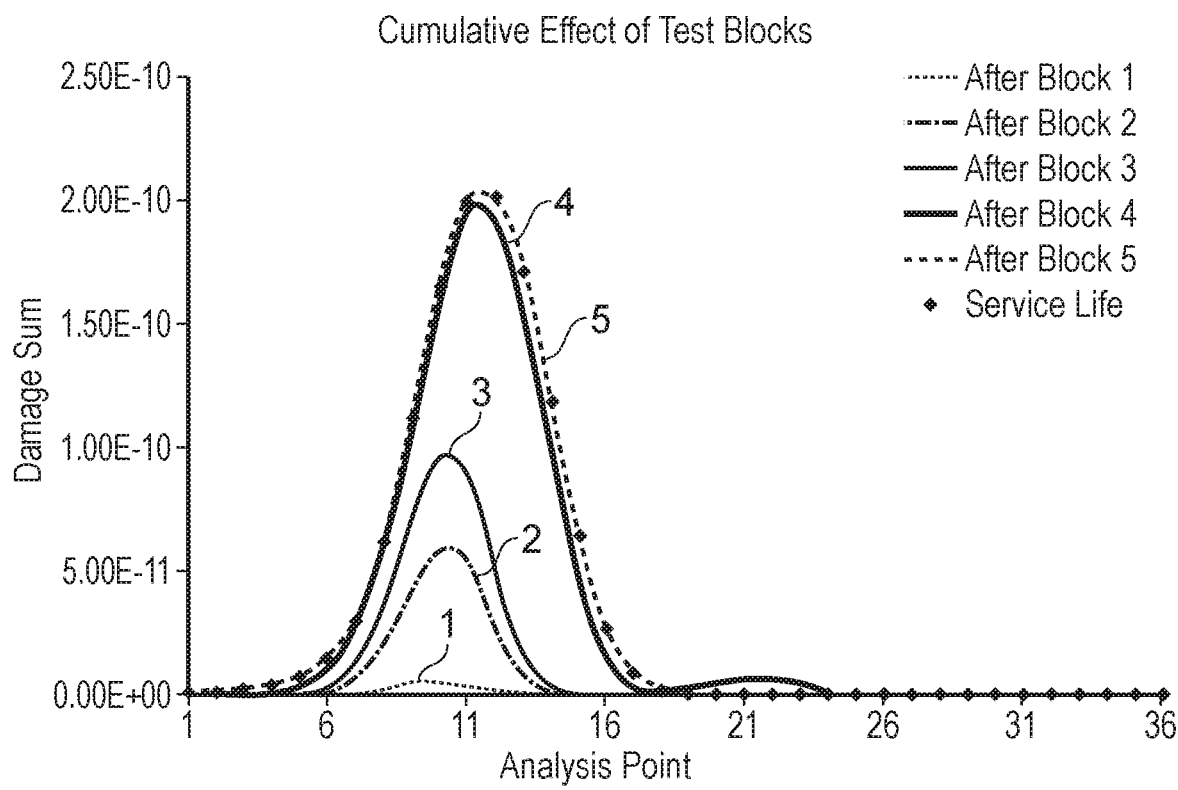
FIG. 7 illustrates the cumulative damage effect of the test blocks of FIG. 5 when applied cumulatively to the blade root section.

FIG. 6 illustrates the effect each of the five test blocks (load blocks) in the table of FIG. 5 has when applied individually to the root section of the test blade. As shown in FIG. 6, only test block 4 causes a damage sum which is relatively close to the predicted service life damage sum and only in relation to the locations around the trailing edge (TE) of the blade. In contrast, as illustrated in FIG. 7, if, according to certain embodiments of the present invention, a number of individual test blocks are applied to the physical test blade instead of one test block, which is the current state of the art, the cumulative damage sum at each location around the root section of the blade becomes closer to the predicted service life damage at each location, until all five test blocks are combined to substantially match the predicted service life damage for each location around the root section of the test blade.

After the design equivalent loads have been calculated for each cross section, they are multiplied by safety factors to account for variation in materials and blade manufacture etc. However, these safety factors have been omitted from the calculations used to generate the following results to facilitate comparisons between the methods. In the following comparisons, the optimisation process according to certain embodiments of the present invention is performed for six blade cross sections at once so the match is not as good as when the optimisation method is performed for only one cross section (as described above in relation to the root section). However, there is still a significant improvement over the under-testing caused by single axis fatigue test methods and the over-testing caused by non-optimised dual axis fatigue test methods, as illustrated in FIG. 8.

Figure 8:
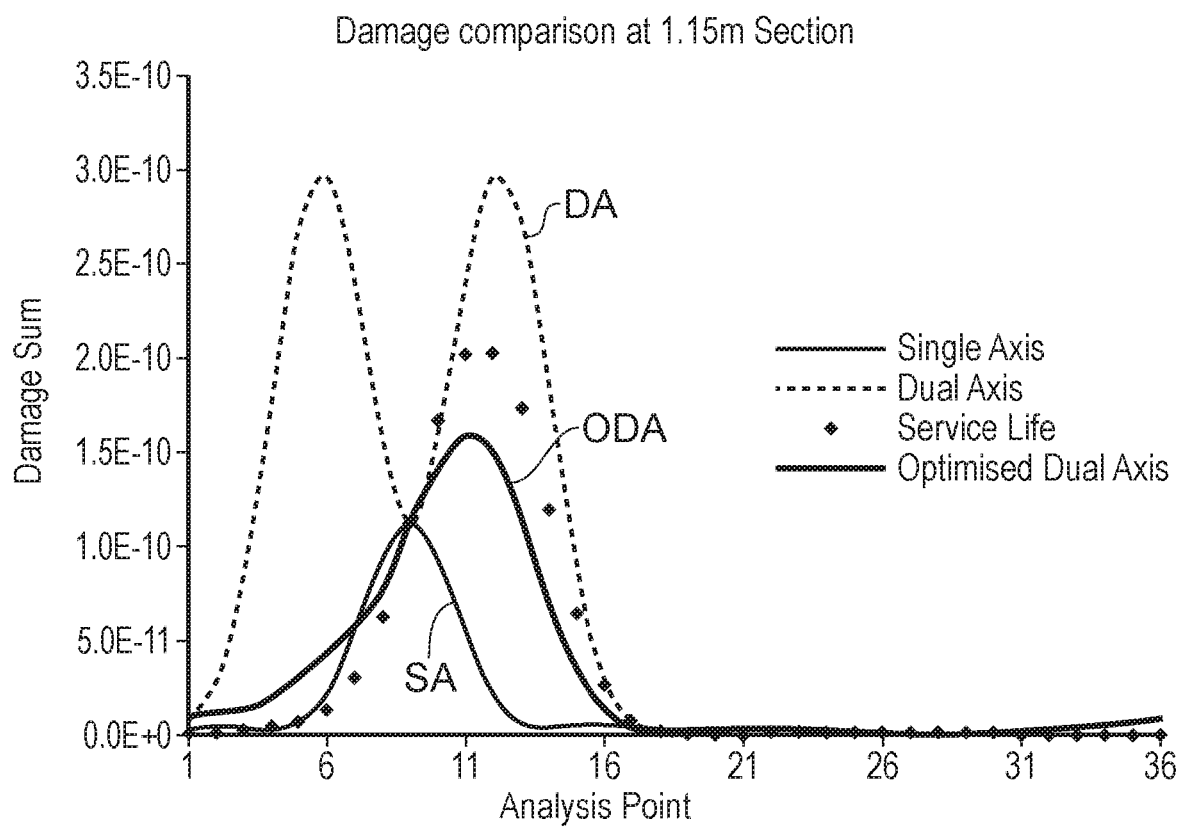
FIGS. 8 to 13 illustrate a comparison of the damage sum at each location around different blade sections for an optimised fatigue test method according to certain embodiments of the present invention and non-optimised fatigue test methods.
Figure 9:
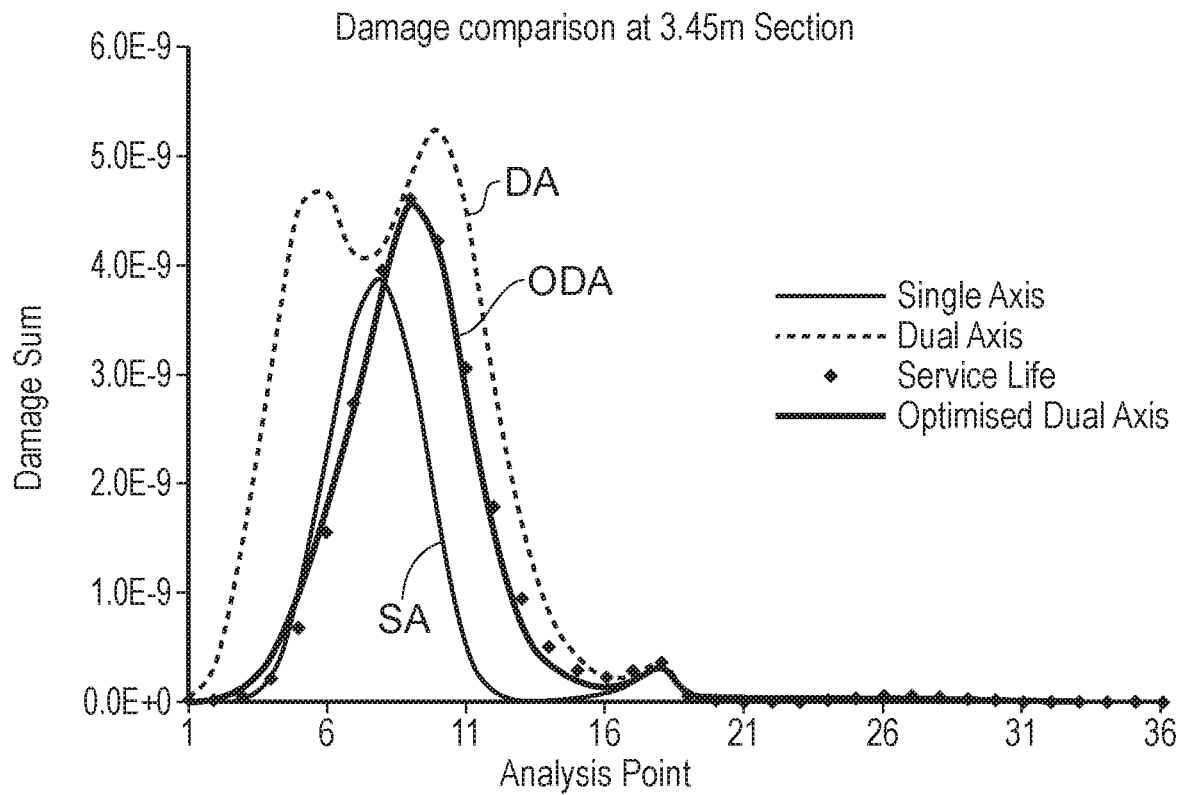
Figure 10:
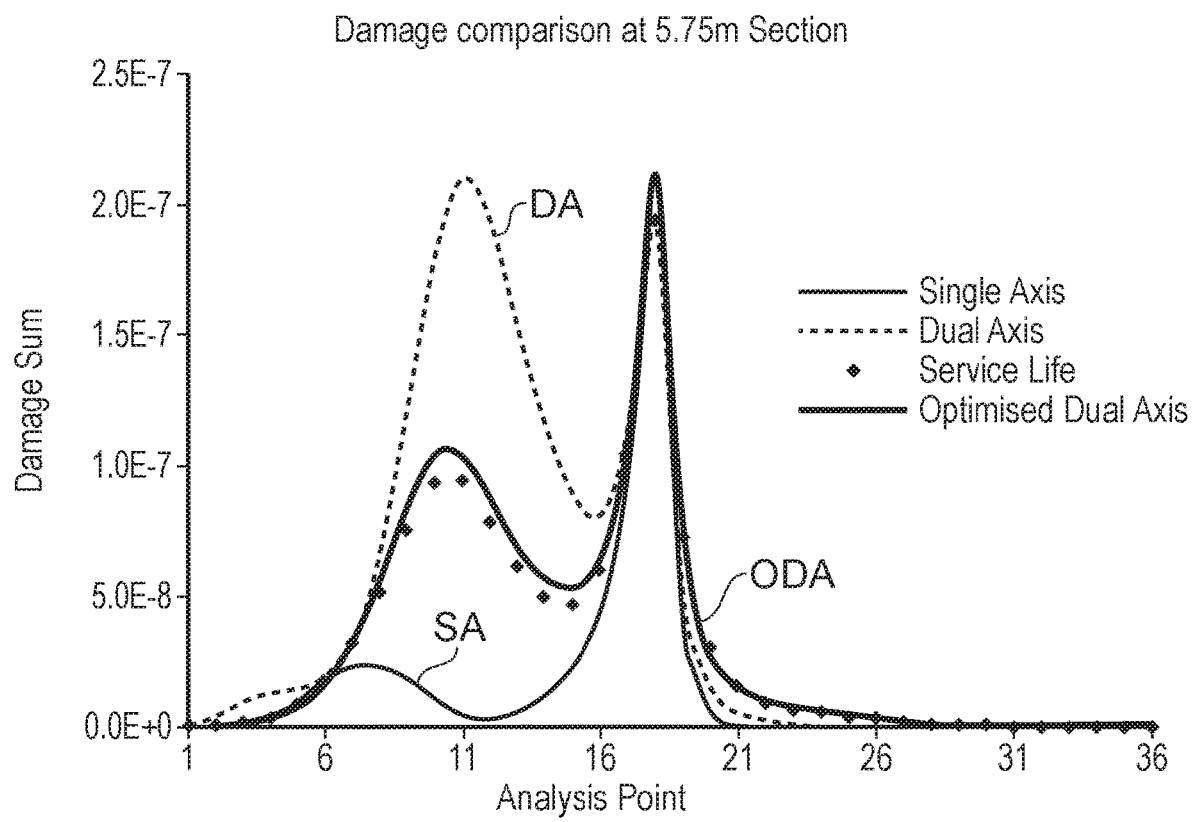
Figure 11:
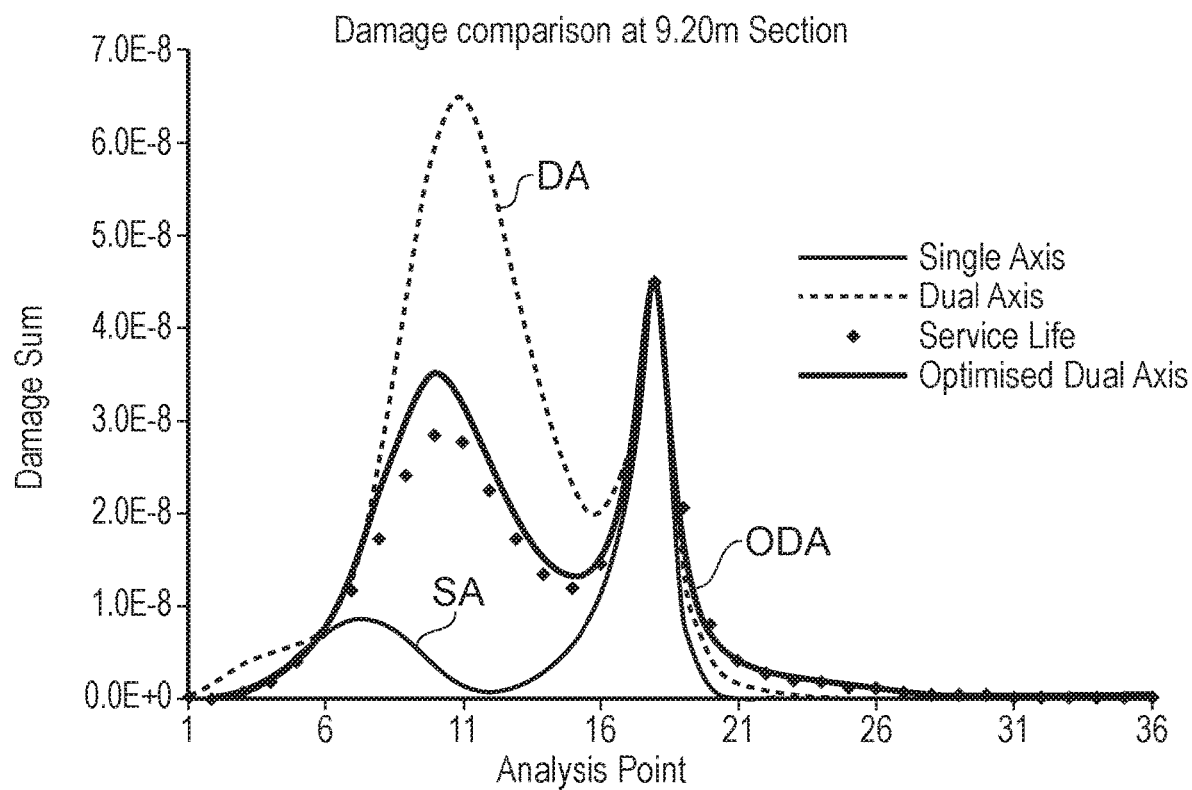
Figure 12:
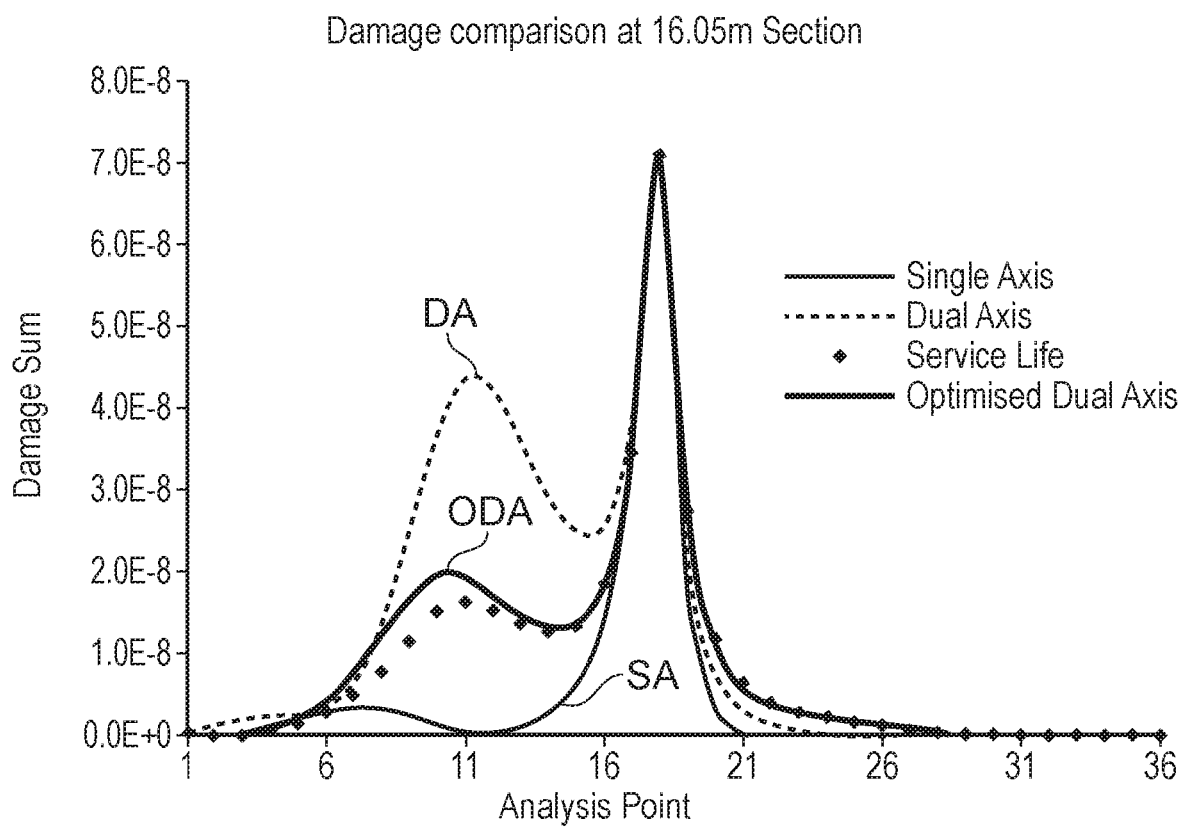
Figure 13:
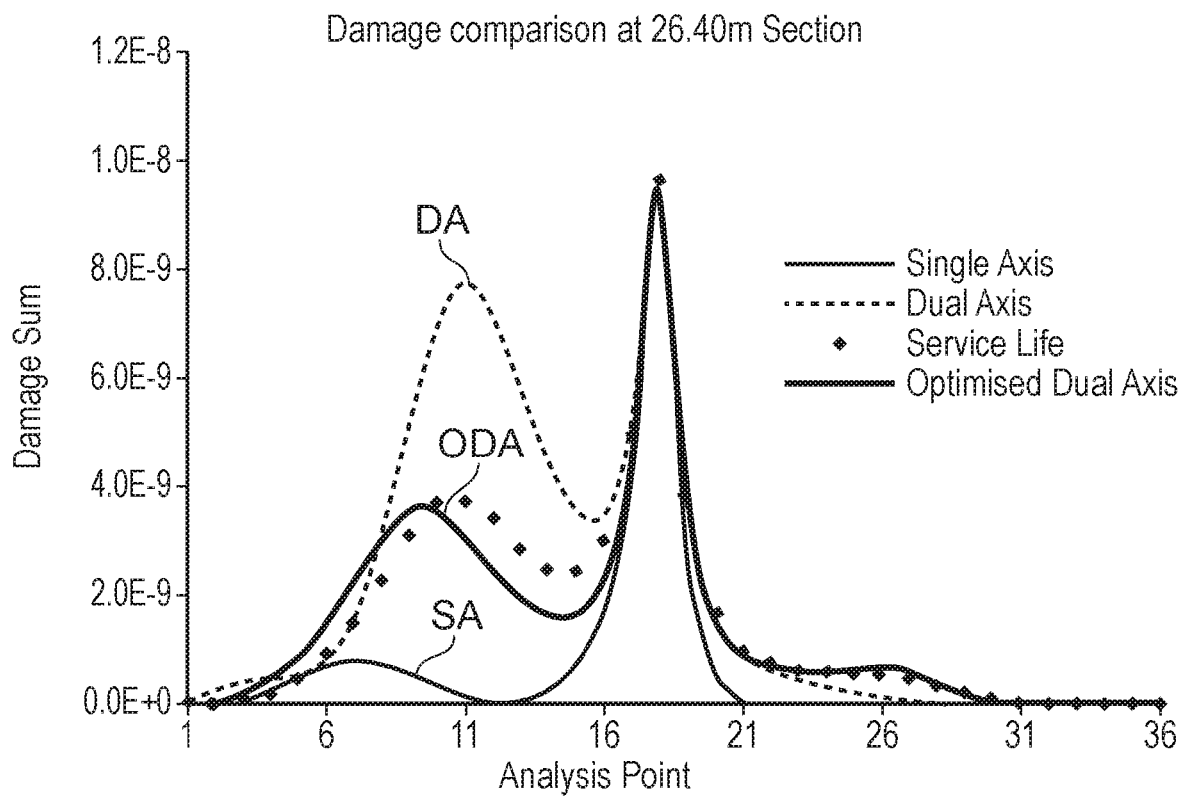

As illustrated in FIGS. 8 to 13, it can be seen that when the non-optimised dual axis (DA) fatigue test method is applied to the test blade, the damage sum at the analysis locations below around number 16, i.e. for the majority of the pressure side (PS) of the test blade, for all six blade sections is significantly higher than the predicted service life damage for those respective locations. For the 1.15 m section case, as illustrated in FIG. 8, the damage peak at around analysis locations 12 to 13 is higher than for the calculated service life, but an additional damage peak at around analysis location 6 is also undesirably present. The non-optimised dual axis fatigue test method thus results in damage that is not representative of service, whilst the single axis (SA) tests do not damage parts of the blade that would be damaged in practice. This is also shown in the damage comparisons for the other sections, as illustrated in FIGS. 9 to 13.

In the optimised dual axis test (ODA) according to certain embodiments of the present invention, the analysis was carried out by effectively applying the physical step of rotating the blade on the test stand part way through the test and continuing, which leads to a different mean load for the next test segment. By combining different test segments with different blade rotations and hence different mean loads, the analysis shows that the damage curve for all sections substantially matched that of the service life and was the closest of all test methods. Certain embodiments of the present invention thus provide a dual axis fatigue test method that substantially represents the service conditions of a wind turbine blade.

Thus, rather than calculating an equivalent load for a given number of cycles and then ensuring that this load is reached during the test and counting the cycles, the optimised fatigue test method according to certain embodiments of the present invention may calculate the damage 'on the fly'. In turn, this may allow adjustments to be made to the test set-up and load levels to be made which modify how damage accumulates around the blade, allowing a much closer match to the service life damage whilst still retaining the benefits of resonant testing.

Certain embodiments of the present invention may be implemented in the form of a computer program product comprising instructions (i.e. a computer program) that may be implemented on a processor, stored on a data sub-carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

Certain embodiments of the present invention, exploit the fact that damage typically accrues more slowly under compressive conditions and subjects parts of the blade where less damage is caused by the service life into compression by pitching the blade on the test stand. Damage will therefore build up more slowly in these regions, and damage can be added to other parts of the blade where it is needed thus providing a more efficient and realistic fatigue test method.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of fatigue testing an elongate specimen, comprising:
   calculating a service life damage sum at one or more locations on at least one respective first section of an elongate specimen, responsive to at least one strain time history associated with the specimen;
   determining a predicted test damage sum at the one or more locations for each of a plurality of predetermined test blocks separately applicable to the specimen, wherein each predetermined test block is defined by a respective test duration, a pitch angle of the specimen with respect to the longitudinal axis of the specimen, a flapwise load amplitude and an edgewise load amplitude; and
   selecting at least one test block associated with the plurality of predetermined test blocks based on a comparison of the predicted test damage sum with the service life damage sum for each of the one or more locations,
   wherein the selected at least one test block is applicable to the specimen and comprises how many times to repeat each of the predetermined test blocks to cause a test damage sum at each of the one or more locations to at least substantially match the service life damage sum at each of the one or more locations.

2. The method as claimed in claim 1 further comprising:
   calculating a service life damage sum at each of a plurality of spaced apart locations on the at least one respective first section of the elongate specimen.

3. The method as claimed in claim 1, wherein each of the plurality of predetermined test blocks is defined by at least a first cyclic load having a first cyclic load amplitude and a first test duration for applying said first cyclic load to the specimen.

4. The method as claimed in claim 3, wherein the first cyclic load is applicable to the specimen in a substantially perpendicular direction with respect to a longitudinal axis of the specimen.

5. The method as claimed in claim 3, wherein each of the plurality of predetermined test blocks is further defined by a further cyclic load having a further cyclic load amplitude and a further test duration for applying said further cyclic load to the specimen.

6. The method as claimed in claim 1, wherein each of the plurality of predetermined test blocks is further defined by a pitch angle of the specimen with respect to a longitudinal axis of the specimen.

7. The method as claimed in claim 5, wherein the specimen comprises an aerofoil cross section having a chord axis and the first cyclic load is a flapwise cyclic load applicable substantially perpendicularly to the chord axis and the further cyclic load is an edgewise cyclic load applicable substantially parallel to the chord axis.

8. The method as claimed in claim 1, further comprising:
   determining a combination of a plurality of said test blocks associated with the plurality of predetermined test blocks, wherein said combination causes a test damage sum at each of the one or more locations that at least substantially matches the service life damage sum at each of the one or more locations when said test blocks are applied to the specimen.

9. The method as claimed in claim 8, further comprising:
   determining the combination of said test blocks to be applied to the specimen responsive to applying a constrained least-squares based optimisation routine to compare the predicted damage sum with the service life damage sum for the one or more locations.

10. The method as claimed in claim 1, further comprising:
    physically applying the at least one test block to the specimen; and
    determining a test damage sum at the one or more locations whilst the at least one test block is being applied to the test specimen.

11. The method as claimed in claim 1, further comprising:
    generating the at least one strain time history for the one or more locations on the at least one first section of the specimen based on at least one load time history associated with the first section of the specimen and at least one cyclic test block associated with the specimen.

12. The method as claimed in claim 1, further comprising:
    calculating the service life damage sum at the one or more locations responsive to performing fatigue analysis of the at least one strain time history using a linear damage algorithm.

13. The method as claimed in claim 12, further comprising:
    reducing a variable amplitude of the at least one strain time history to a constant amplitude responsive to applying a cycle counting algorithm to the at least one strain time history.

14. The method as claimed in claim 1, wherein the at least one section of the specimen comprises a plurality of spaced apart sections located along a length of the elongate specimen and perpendicularly oriented with respect to a longitudinal axis of the specimen, each section having respective one or more locations.

15. A system for fatigue testing an elongate specimen, comprising:
    a controller for performing the method as claimed in claim 1; and
    apparatus operatively associated with the controller for applying the selected at least one test block to an elongate specimen.

16. The system as claimed in claim 15, wherein the at least one test block comprises a first cyclic load applied in a first direction to the elongate specimen and a further cyclic load applied in a further direction to the elongate specimen.

17. The system as claimed in claim 16, wherein the first and further directions are substantially perpendicular with respect to each other and/or to a longitudinal axis of the specimen.

18. A computer program comprising instructions which when implemented on a computer controls the computer to perform the method as claimed in claim 1.

19. A method of fatigue testing an elongate specimen, comprising:
    calculating a service life damage sum for at least one location on an elongate specimen responsive to a strain time history associated with said location;
    determining a predicted damage sum at said location responsive to each of a plurality of test blocks applicable to the specimen, wherein each test block is defined by a respective test duration, a pitch angle of the specimen with respect to the longitudinal axis of the specimen, a flapwise load amplitude and an edgewise load amplitude; and selecting one or more test blocks from said plurality of test blocks to apply to a test specimen to cause a test damage sum at said location to substantially match the determined service life damage for said location, wherein the selected at least one test block comprises how many times to repeat each of the predetermined test blocks.

* * * * *